July 30, 1963 C. R. TAYLOR 3,099,372
DISPENSING DEVICE HAVING SLITTED TOP PORTION
Filed Feb. 9, 1960 2 Sheets-Sheet 1

CLARENCE R. TAYLOR
INVENTOR.

BY *Steve W. Grembow*

ATTORNEY

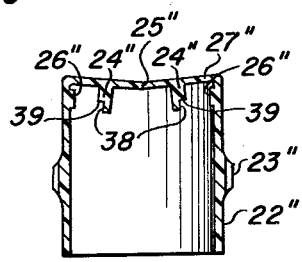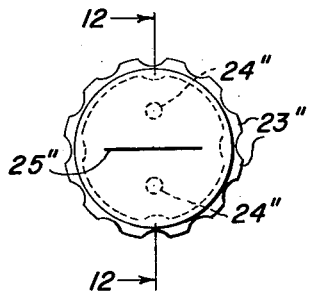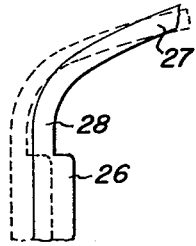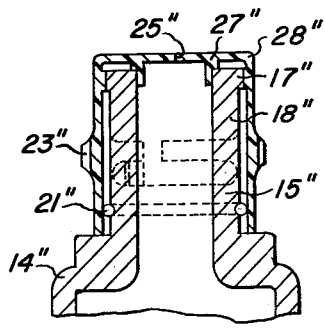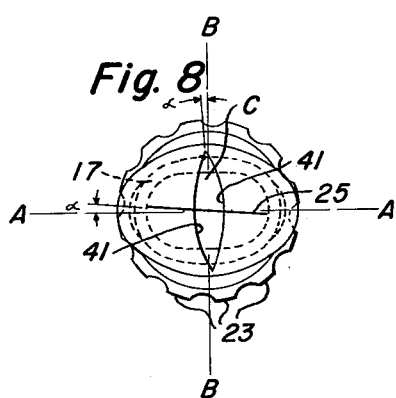

United States Patent Office 3,099,372
Patented July 30, 1963

3,099,372
DISPENSING DEVICE HAVING SLITTED TOP PORTION
Clarence R. Taylor, Rochester, N.Y.
(28 Woodside Drive, Penfield, N.Y.)
Filed Feb. 9, 1960, Ser. No. 7,717
3 Claims. (Cl. 222—490)

This invention relates generally to dispensers, and more specifically to an improved dispensing device of the type having a cooperable container spout and cap in which the cap is adapted to be selectively movable between an open position for dispensing the contents of the container, and a closed position for preventing the contents of the container from escaping therefrom.

Dispensing devices of this general type for dispensing pastes, liquids, viscous solutions such as glue, and comminuted materials such as sugar, salt, pepper and the like, are generally well known in the art, and one such specific device is disclosed in U.S. Patent No. 2,585,527. Although dispensing devices of the type disclosed in the above-identified patent are known to operate satisfactorily, they nevertheless suffer certain disadvantages. One of these disadvantages is that no means are incorporated in the dispensing device for automatically locating the open and closed positions of the cap. It is necessary for the operator to closely observe the cap as he is turning it, and to stop further turning of the cap when he notices that the slit therein is either tightly closed or open a sufficient amount. Another disadvantage of these prior art dispensers is that no means are incorporated therein for releasably locking the cap in the open or closed positions. Still another disadvantage is that any paste dispensed from a device of this type conforms to the shape of the open slit and consequently the outer edges thereof are sharp or feathered. This has a tendency to make the paste curl as it is being dispensed, and in many instances in order to get a sufficient quantity of paste, the width of the band of paste emitted must be excessive. A further disadvantage of the prior art dispensers is that no positive means are provided for successively increasing the stretching of the cap as it is moved into the closed or open positions. Applicant's improved dispensing device is believed to obviate these and other disadvantages of prior-known dispensing devices.

One of the primary objects of this invention is to provide an improved dispensing device having a cooperable container spout and cap in which the cap is rotatably mounted on the open spout of the container and is adapted to be automatically selectively movable on the spout between an open position for dispensing the contents of the container, and a closed position for preventing the contents of the container from escaping therefrom.

Another object of the invention is to provide an improved cap for a container which is inert to most materials or liquids which the container might hold.

A further object of this invention is to provide an improved cap for a dispensing device adapted to be selectively movable thereon between open and closed positions with a minimum of effort.

A still further object of the invention is the provision of an improved dispensing device that is of simple design and construction, thoroughly reliable and efficient in operation, and economical to manufacture.

Another object of the invention is the provision of an improved dispensing device having a cooperable non-cylindrical spot and slitted cap in which the spout stretches the cap and is adapted to forcibly selectively open and close the slit when the cap is manually turned on the spout.

An additional object of this invention is to provide an improved dispensing device having stop means for automatically locating and positioning the cap on the spout in its open and closed positions.

Another object of this invention is to provide an improved dispensing device, in which the cap thereof is subjected to the greatest amount of distortion and stretching when it is positioned with its slit either parallel or perpendicular to the major axis of the spout.

Still another obect of this invention is to provide an improved dispensing device having means for effectively eliminating the feather edge from paste material that is emitted from the container.

A further object of the invention is to provide an improved dispensing device in which the cap and slit are not objectionably distorted and twisted out of shape as the cap is moved into the zone between its open and closed positions.

Another object of the invention is the provision of an improved dispensing device having means for releasably locking the cap in its open and closed positions.

A more specific object of the invention is to provide cam followers carried by the cap adapted to cooperate with the inner periphery of the spout for positively closing the slit when the cap is moved to the closed position.

Another specific object of the invention is to provide cam followers carried by the cap adapted to cooperate with the outer periphery of the spout for progressively increasing the stretching of the cap as it is moved toward the closed and open positions.

Still another specific object of the invention is to provide a dispensing device having a top molded with a conical depression which is urged by the spout to lie in a substantially flat horizontal plane when the cap is operatively mounted on the spout.

With the foregoing and other objects in view, this invention comprises certain novel constructions, combinations, and arrangments of parts as will be hereinafter fully described, illustrated in the accompanying drawing, and more particularly pointed out in the appended claims.

In the drawings:

FIG. 8 is a top plan view of the cap mounted on a spout shown dotted, and showing the shape and position of the slit in both the closed and open positions of the cap, and the fact that in each position of the cap, it is moved a few degrees past the dead center positions in which the slit is parallel or perpendicular to the major axis of the spout;

FIG. 10 is a view similar to FIG. 7 showing a modified form of cap;

FIG. 11 is a top plan view of the cap of FIG. 10;

FIG. 12 is a section view taken substantially along line 12—12 of FIG. 11 showing the cap mounted on a spout; and FIG. 13 is an enlarged segmental view of a portion of the cap of FIG. 7.

Figure 1:
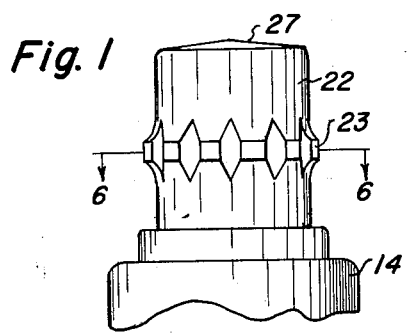
FIG. 1 is a segmental side elevation view showing a preferred embodiment of the dispensing device of this invention.
Figure 2:
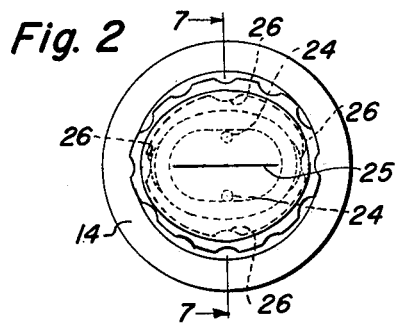
FIG. 2 is a top plan view of the dispensing device of FIG. 1.
Figure 5:
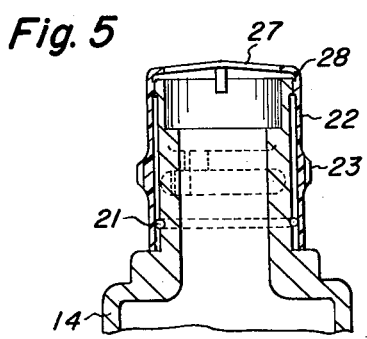
FIG. 5 is a section view of the dispensing device of FIG. 1.
Figure 6:
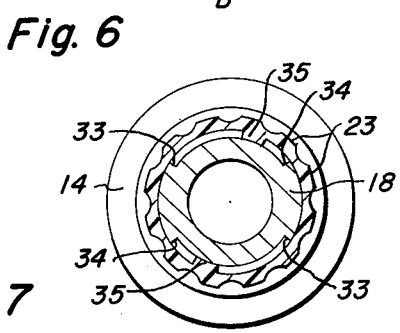
FIG. 6 is a section view substantially taken on line 6—6 of FIG. 1.
Figure 7:
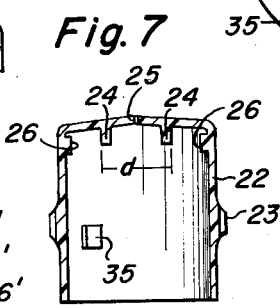
FIG. 7 is a section view of only the cap of FIG. 2 taken substantially along 7—7.

As shown in the drawings, a preferred embodiment of the dispensing device of this invention is disclosed in FIGS. 1-8 comprising a cylindrical container 14 constructed from any suitable material such as metal, glass or plastic. The container 14 has an integrally formed spout 15 comprising a cylindrical base portion 16, and an upper or terminating elliptical annular cam member 17 of substantially oval-shaped axial cross-section joined together by an intermediate portion 18, two sides of which slant inwardly. The outer dimension of cam member 17 taken along its major axis A—A is greater than the outer dimension taken along its minor axis B—B for a purpose to be explained hereinafter. The base portion 16 has an annular groove 19 for receiving an O ring 21 adapted to cooperate with the lower end of a substantially cylindrical cap to provide a seal for preventing the escape of liquid from container 14. The cap 22 as best seen in FIGS. 1 and 5, is rotatably mounted on spout 15 and is constructed or molded from a flexible material such as rubber, or Teflon or any other suitable plastic which is inert to most materials held by container 14, and further has a low coefficient of friction with respect to spout 15 so that it may be readily turned thereon. To facilitate turning or rotating cap 22 on spout 15, its cylindrical body portion is provided with circumferentially spaced peripheral ridges 23 by which cap 22 may be manually gripped and turned by the operator. Although ridges 23 are formed intermediate the ends of cap 22, they may be disposed anywhere along the body portion. The top 27 of cap 22 is arcuately-shaped and is provided with a slit 25 therethrough of a length greater than the distance between the inner surfaces of member 17 along axis A—A. Cap 22 further has a pair of cylindrical projections 24 integrally formed therewith, one on each side of slit 25 adapted to cooperate with the inner periphery of cam member 17 for positively closing slit 25. To accomplish this, the distance between the surfaces of projections 24 which engage the inner periphery of cam 17 and is designated "d" in FIG. 7 is slightly greater than the distance between the inner surfaces of cam member 17 along minor axis B—B, designated "e" in FIG. 4. Cap 22 is further provided with four cam followers 26 molded therein adjacent the upper end of the sides of cap 22 and having a semi-cylindrical cam surface adapted to cooperate with the outer periphery of the cam member 17. Top 27 has a small annular peripheral depending section 28 of smooth radius merging with the top of the body portion of cap 22 as best seen in FIG. 13. The section 28 facilitates expansion of cap 22 by cam member 17 as seen dotted in FIG. 13 without excessively stretching and distorting top 27.

Figure 3:
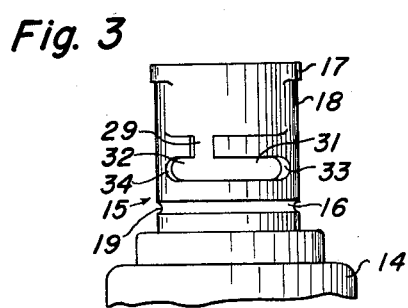
FIG. 3 is a segmental side elevation view showing the container spout upon which the cap of the dispensing device is mounted.
Figure 4:
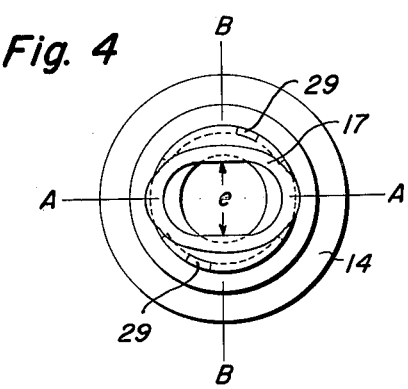
FIG. 4 is a top plan view of the spout of FIG. 3.

The cylindrical portion 16 of spout 15 is provided with diametrically opposed inverted T-shaped slots, each having a vertical leg 29 and a pair of horizontal legs 31, 32 terminating in shoulders 33, 34 respectively as best seen in FIGS. 3, and 6. The T-shaped slots are adapted to slidably receive diametrically opposed pins 35 mounted on the inner periphery of the body portion of cap 22.

Figure 9:
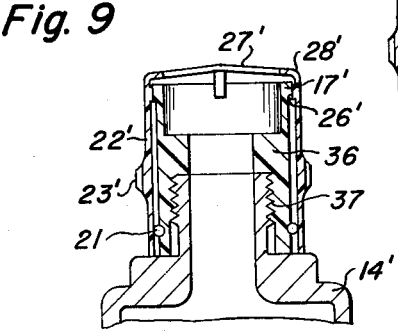
FIG. 9 is a view similar to FIG. 5 showing a modification of the invention.

In the modification of the invention seen in FIG. 9 an adapter spout 36 having an outside configuration similar to spout 15 is provided with a threaded bore 37. Accordingly, the adapter 36 may be screwed onto any type of container having a conventional threaded spout. In this modification, all parts similar to enumerated parts in FIGS. 1-8 are designated by the same numerals primed.

In the modification of the invention shown in FIGS. 10-12, all parts similar to enumerated parts shown in FIGS. 1-8 are designated by the same numerals double primed. The top of cap 27" is originally molded with a conical depression forming an angle of substantially 5 degrees with the horizontal. The cylindrical projections 24" integrally formed with cap 22" have a stepped end forming a first cam follower surface 38 adapted to cooperate with the inner periphery of cam member 17" for positively closing slit 25", and a second cam follower surface 39 adapted to cooperate with the end surface of cam member 17" for controlling the position assumed by the top of cap 27" so that it is maintained substantially flat in a horizontal plane throughout operation of cap 22". The distance $d''$ between the first cam follower surfaces 38 is slightly greater than the distance $e''$ between the inner surfaces of cam member 17" along minor axis B—B to provide positive sealing of lips 25". When this type of cap 22" is mounted on spout 15" as seen in FIG. 12, cam follower surface 39 engages end surface of cam member 17" which maintains top 27" of cap 22" substantially flat. When cap 22" is moved to its open position, the tendency for the top 27" of cap 22" to be bowed outwardly is counteracted by the inherent tendency of cap 22" to assume its original depressed position. Consequently, the top 27" of cap 22" in operation remains substantially flat eliminating any excessive distortion and bulging thereof.

To install cap 22 shown in FIG. 7 on spout 15, an O ring 21 is first seated in groove 19 of spout 15, and cap 22 is positioned above spout 15 with pins 35 in register with vertical legs 29. The cap 22 is then pressed downwardly onto spout 15 as far as it will go, cap 22 being stopped by pins 35 striking one edge of legs 31, 32. The lower end of cap 22 is forced over O ring 21 into sealing engagement therewith. From this position, cap 22 may be moved in a clockwise direction as seen in FIG. 6 until pins 35 engage shoulders 34 stopping cap 22 in a closed position. Moving cap 22 in the opposite direction until pins 35 engage shoulders 33 positions cap 22 in the open position. The shoulders 33, 34 are so located with respect to pins 35 that when pins 35 are in engagement therewith, slit 25 as best seen in FIG. 8 is a few degrees designated by the Greek letter "α" past one of the "dead center" positions. The "dead center" positions occur when slit 25 in cap 22 is either parallel to major axis A—A or perpendicular thereto. Moving cap 22 so that slit 25 is turned a few degrees past either of the "dead center" positions, releasably lock the cap 22 in the open or closed positions because additional energy or work is required to move cap 22 from the open or closed positions to the "dead center" positions. The additional energy is necessary to force cam followers 26 along the outer periphery of cam member 17 until they are in alignment with the major and minor axis A—A and B—B at which time the body portion of cap 22 is deformed or stretched the greatest amount. Projections 24 are inoperative when cap 22 is in the open position, but cooperate with the inner periphery of cam member 17 to positively close slit 25 in the closed position since, as indicated heretofore, the distance "d" between the outer surfaces of projections 24 is slightly greater than the distance "e" between the inner surfaces of cam member 17 along minor axis B—B. The installation of cap 22 shown in FIG. 10 on spout 15" is similar to that of cap 22 except that the second cam follower surfaces 39 ride on the end surface of cam member 17 and cooperate therewith to maintain the top 27" of cap 22" substantially flat in a horizontal plane throughout the operation of cap 22 as seen in FIG. 12. This is accomplished by properly designing the configuration of the end surface of cam member 17 and the second cam follower surface 39 with respect to the top 27" of cap 22".

Let us assume initially that the container is filled with a paste and the cap 22 turned into the open position. In this position, the top of spout 15 cooperates with the top 27 of cap 22 to control the shape of the band of paste emitted from container 14. In this instance, the paste would have the generally cigar shape designated C in FIG. 8 defined by lips 41 and a portion of the inner periphery of cam follower 17. It is apparent, therefore, that the top of spout 15 is combination with top 27 of cap 22 having a slit 25 of greater length than the distance between the inner surfaces of cam member 17 along major axis A—A, completely eliminates a wide band having a feather edge and provides a substantially narrower band of paste of substantial width throughout its cross section.

The invention has been described in detail with particular reference to preferred embodiments thereof, but it will be understood that variations and modifications can be effected within the spirit and scope of the invention as described hereinabove and as defined in the appended claims.

I claim:

1. In a dispensing device, the combination comprising: a container having a spout, the free end of which has an inner elliptical cam surface; and a substantially cup-shaped cylindrical flexible cap rotatably mounted on said spout and movable between open and closed positions, said cap including a closed off top portion having a slit therethrough and a pair of depending projections on opposite sides of said slit adapted to slidably engage said cam surface for positively forcing said slit closed upon rotation of said cap to said closed position.

2. In a dispensing device, the combination comprising: a container having a spout provided with an elliptical cam at one end thereof, said spout further having an inverted T-shaped slot forming first and second shoulders and said cam having major and minor axes; and a cup shaped cap including a cylindrical body portion having a pin and two pairs of diametrically opposed radially extending cam followers on its inner periphery angularly spaced 90 degrees apart a closed-off top portion having a slit and a peripheral depending section of small radius interconnecting said top and body portions, said cap further being rotatably mounted on said spout with said slot slidably receiving said pin and said cam followers slidably engaging the outer periphery of said cam, said cap further being movable between a first position in which said pin engages said first shoulder and one of said pairs of diametrically opposed cam followers are a few degrees out of alignment with said major axis on one side thereof whereby said slit is releasably held closed, and a second position in which said pin engages said second shoulder and the remaining pair of diametrically opposed cam followers are a few degrees out of alignment with said major axis on the opposite side thereof whereby said slit is releasably held opened.

3. The invention according to claim 1 wherein each of said projections has a shoulder adapted to engage the top of said spout.

References Cited in the file of this patent

UNITED STATES PATENTS

| | | |
|---|---|---|
| 1,696,506 | Smith | Dec. 25, 1928 |
| 1,739,922 | Smith | Dec. 17, 1929 |
| 1,830,990 | Feih | Nov. 10, 1931 |
| 2,122,299 | Sloan | June 28, 1938 |
| 2,585,527 | Adams | Feb. 12, 1952 |
| 3,016,172 | Morrow et al. | Jan. 9, 1962 |